United States Patent
Sekharan et al.

(10) Patent No.: US 10,789,262 B2
(45) Date of Patent: Sep. 29, 2020

(54) PROGRESSIVE CHART RENDERING (71) Applicant: SAP SE, Walldorf (DE)

(72) Inventors: Satishkumar Sekharan, Coquitlam (CA); Yuru Wang, Coquitlam (CA)

(73) Assignee: SAP SE, Walldorf (DE)

( * ) Notice: Subject to any disclaimer, the term of this patent is extended or adjusted under 35 U.S.C. 154(b) by 630 days.

(21) Appl. No.: 15/656,640

(22) Filed: Jul. 21, 2017

(65) Prior Publication Data
US 2018/0336253 A1 Nov. 22, 2018

Related U.S. Application Data (60) Provisional application No. 62/506,739, filed on May 16, 2017.

(51) Int. Cl.
*G06F 16/00* (2019.01)
*G06F 16/248* (2019.01)
*G06F 3/14* (2006.01)

(52) U.S. Cl.
CPC .......... *G06F 16/248* (2019.01); *G06F 3/14* (2013.01); *G09G 2360/121* (2013.01); *G09G 2370/027* (2013.01)

(58) Field of Classification Search
None
See application file for complete search history.

(56) References Cited

U.S. PATENT DOCUMENTS

| | | | | |
|---|---|---|---|---|
| 6,766,352 B1* | 7/2004 | McBrearty | ............ | H04L 67/00 709/203 |
| 8,219,633 B2* | 7/2012 | Fainberg | ............ | H04L 67/02 709/213 |
| 8,832,288 B1* | 9/2014 | Mahkovec | ............ | G06F 16/9574 709/229 |
| 2004/0133848 A1 | 7/2004 | Hunt et al. | | |
| 2013/0162678 A1* | 6/2013 | Harris | ............ | G09G 5/00 345/634 |

FOREIGN PATENT DOCUMENTS

WO 2014/134234 A1 9/2014

OTHER PUBLICATIONS

"Communication: Extended European Search Report", European Patent Office, dated Jun. 29, 2018, European Application No. 17002027.5-1209, 8pgs.

* cited by examiner

*Primary Examiner* — Son T Hoang
(74) *Attorney, Agent, or Firm* — Buckly, Maschoff & Talwalkar LLC (57) ABSTRACT

A system includes reception of a request to display a data chart. In response to the request, a cached version of the data chart is retrieved from a memory, the cached version of the data chart is displayed, and while the cached version of the data chart is displayed, current data of the data chart is requested from a remote data source. Also while the cached version of the data chart is displayed, an active version of the data chart is rendered based on the current data. The displayed cached version is then replaced with a display of the rendered active version.

17 Claims, 7 Drawing Sheets

PROGRESSIVE CHART RENDERING

CROSS-REFERENCE TO RELATED APPLICATIONS

This application is related to, and claims benefit of and priority to, U.S. Provisional Patent Application No. 62/506,739, filed May 16, 2017, the contents of which are hereby incorporated by reference in their entirety for all purposes.

BACKGROUND

Conventional systems attempt to improve application performance by improving the efficiency with which content is generated, improving the efficiency with which the generated content is acquired and/or improving the efficiency with which acquired content is rendered on a display. Each of these efficiencies effect not only the performance of an application but also a user's perception of the application's performance. Since user satisfaction is attributable in large part to this perceived performance, other techniques for improving perceived application performance are desired.

DETAILED DESCRIPTION

The following description is provided to enable any person in the art to make and use the described embodiments. Various modifications, however, will remain readily apparent to those in the art.

Generally, some embodiments improve the perceived performance of a data-rendering application. According to some embodiments, and in response to a request for a data visualization, a local cached copy of the data visualization is initially rendered while active data is contemporaneously fetched in the background. The fetched active data is rendered in a hidden mode. Once fetching and rendering of the active data is complete, the rendered cached data is swapped out for the hidden rendered data. Because a data visualization (i.e., the cached copy) is rendered before the active data is fetched, a user perceives improved performance as compared to systems which render a requested chart only after the active data of the requested chart is received.

Figure 1:
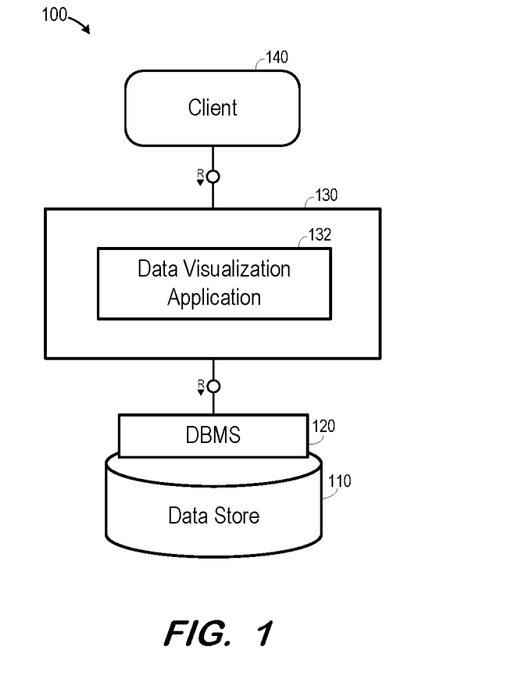
FIG. 1 is a block diagram of a system architecture according to some embodiments.

FIG. 1 is a block diagram of system 100 according to some embodiments. Embodiments are not limited to the FIG. 1 system. System 100 includes data store 110, database management system (DBMS) 120, server 130, and clients 140. Server 130 may execute data visualization application 132 to provide visualizations of data stored in data store 110 according to some embodiments. Server 130 may also receive requests from client 140 and provide the data visualizations thereto in response. The data visualizations may be provided in a format which may be rendered by applications executed by client 140 (e.g., a Java Execution Engine executing within a Web Browser on client 140).

According to some embodiments, client 140 executes a Web browser to present a user interface to a user on a display of client 140. The user enters a query into the user interface, and client 140 passes a request based on the query to server 130. Server 130 generates an SQL script based on the request, and forwards the SQL script to DBMS 120. DBMS 120 executes the SQL script to return a result set to server 130 based on data of data store 110, data visualization application 132 generates a data visualization based on the result set, and the client 140 renders the data visualization. According to some embodiments, client 140 receives the result set and generates and renders a data visualization based thereon.

Data store 110 may comprise any data sources which are or become known, including but not limited to database views, spreadsheets, relational databases and/or OnLine Analytical Processing cubes. Data store 110 may also comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

System 100 may be located on-premise according to some embodiments. According to other embodiments, server 130, DBMS 120 and data store 110 are located off-site (e.g., in the Cloud) and are accessed via client 140 over Web protocols.

Figure 2:
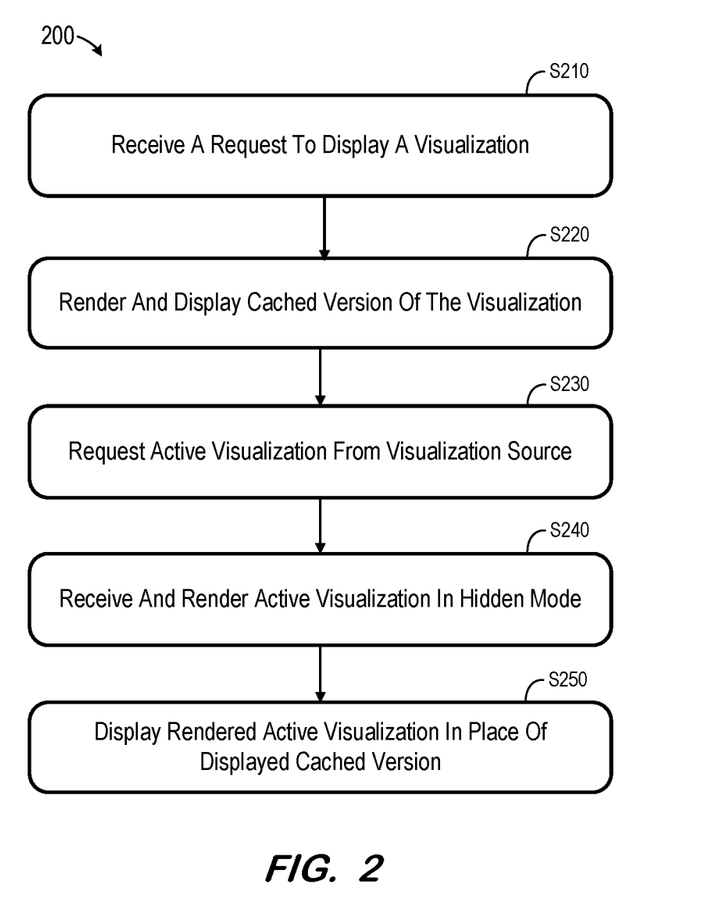
FIG. 2 is a flow diagram of a process according to some embodiments.

FIG. 2 comprises a flow diagram of process 200 according to some embodiments. In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a request to display a visualization is received. The request may be received from a user operating a user interface presented by a Web browser executing on a client system (e.g., a desktop computer, a tablet computer, a mobile phone). More particularly, the user interface may be presented as a result of execution of a Web application by an execution engine of a Web browser. For example, the request may comprise a request for a chart of sales data for several geographical regions over a certain time period.

Figure 3:
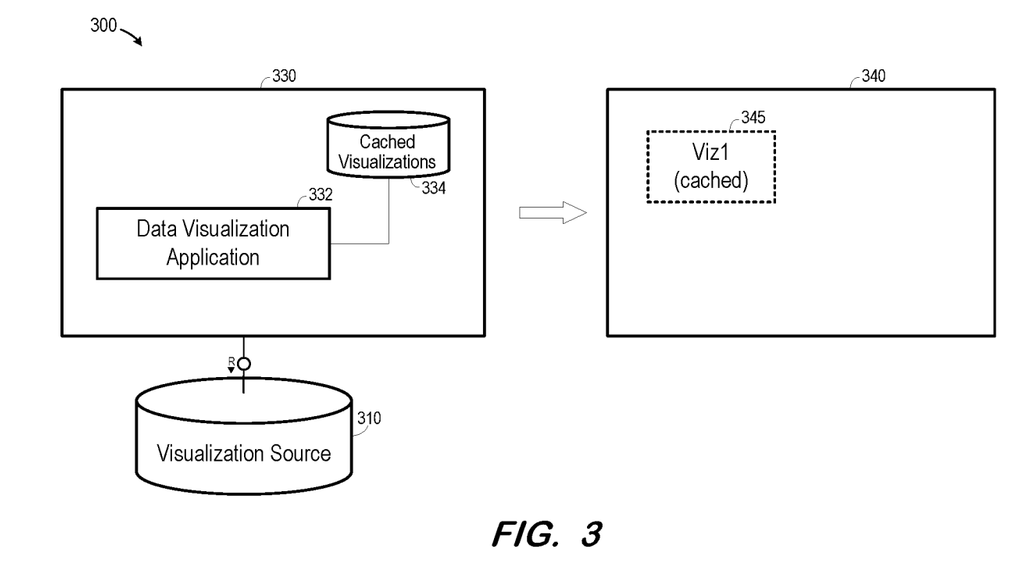
FIG. 3 is a block diagram illustrating operation according to some embodiments.

In response to the received request, a cached version of the visualization is rendered and displayed at S220. FIG. 3 illustrates system 300 to illustrate process 200 according to some embodiments. As shown, data visualization application 332 is executed by client system 330 and receives the request to display a visualization at S210. According to some embodiments, a cached version of the visualization is retrieved from cached visualizations 334 stored in a local storage (e.g., a local persistence) of client 330. As will be described below, the cached version may have been stored in cached visualizations 334 as a result of a prior request for the data visualization. FIG. 3 also illustrates interface 340 including the rendered cached visualization 345. Interface 340 is presented on a display device of client system 330.

Returning to process 200, an "active" version of the data visualization is requested at S230. In some embodiments, the active version of the visualization is based on data stored in visualization source 310. Accordingly, application 332 may request the data visualization from visualization source 310 at S230. Visualization source 310 may comprise a database platform such as server 130 and data store 110 of FIG. 1.

The active version may comprise current data associated with the visualization. The data may include sales figures and/or other measures that are known. The active version may comprise a description of a visualization incorporating such current data, for example, a JavaScript Object Notation file.

At S240, the active visualization is received and rendered in a hidden mode. For example, the active visualization may be rendered but not yet displayed as will be described below.

S230 and S240 may occur contemporaneously with S220 according to some embodiments. For example, a main thread of application 332 may render and display the cached version while a worker thread requests the active visualization at S230 and receives and renders the active visualization at S240.

Figure 4:
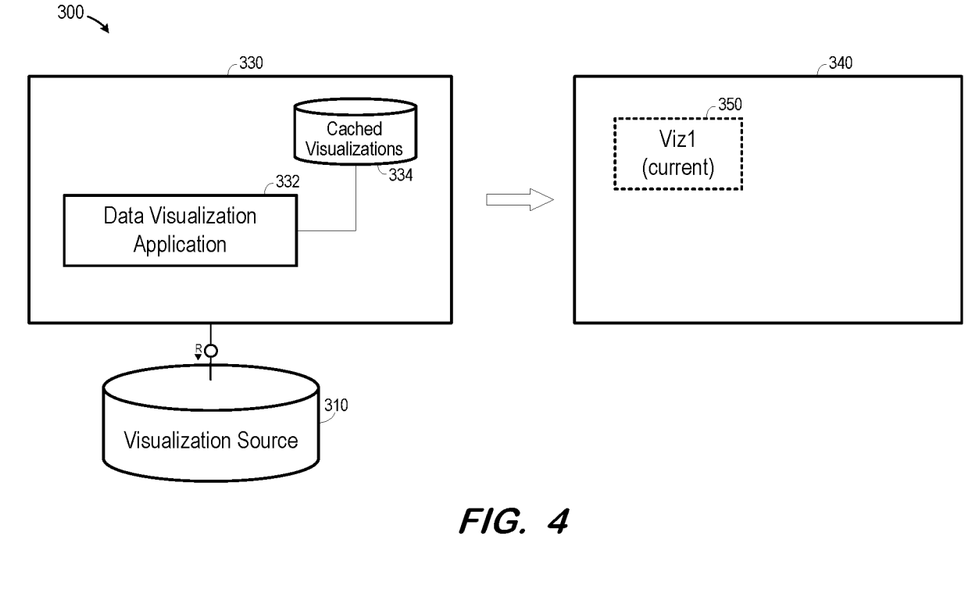
FIG. 4 is a block diagram illustrating operation according to some embodiments.

Finally, at S250, the rendered active visualization is displayed in place of the displayed cached version. FIG. 4 illustrates display of the rendered active visualization 350 in place of the displayed cached version. According to some embodiments, S250 includes swapping the rendered visualizations in a manner which minimizes the visual disturbance to the user. For example, the cached version may be render in a first div which is displayed while the active visualization may be rendered in a second div co-located with the first div but which is not displayed. At S250, the divs are swapped to bring the active visualization to the front and remove the cached copy.

According to some embodiments, hovering a cursor over a displayed cached version (e.g., visualization 345) may result in display of a "loading" indicator icon, while hovering over a displayed active version (e.g., visualization 350) may result in display of a tooltip associated with the marks in the visualization. In some embodiments, the data of the active visualization (i.e., the data stored in visualization source 310 at the time of the request for the active visualization) may be identical to the data represented in the cached version, therefore the active visualization and the cached version are identical and the replacement at S250 may be imperceptible.

Figure 5:
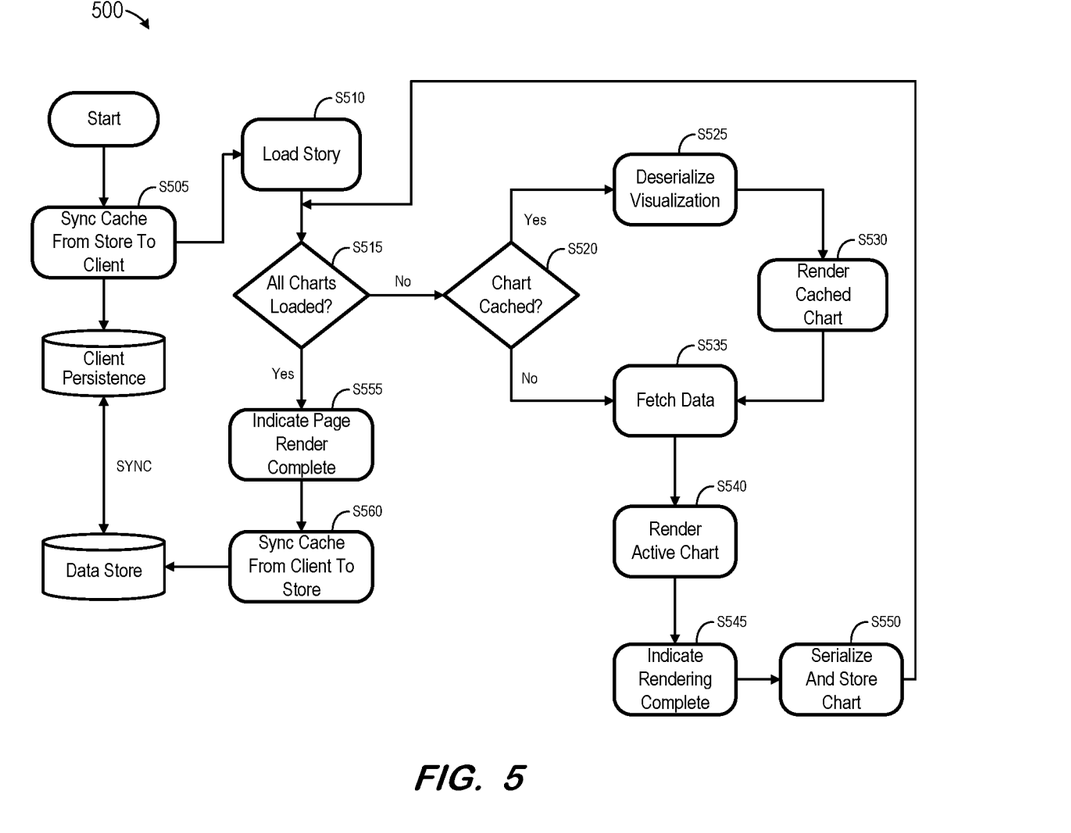
FIG. 5 is a flow diagram of a process according to some embodiments.

FIG. 5 illustrates process 500 according to some embodiments. Process 500 may comprise an implementation of process 200, but embodiments are not limited thereto.

Process 500 concerns the presentation of a "story" consisting of one or more data visualizations, or charts. Upon system start (e.g., initialization of data visualization application 135) at S505, all charts persisted in a central data store (e.g., visualization source 310) are synchronized to a client persistence (e.g., volatile memory, cache 334) located on a client system. The charts may be persisted in a serialized format (e.g., JSON) which represents a graphic view of a chart, including its constituent data.

A command to load a story is received at S510, and it is determined at S515 whether all charts have been loaded, or rendered with current active data. For each chart in the story, it is determined at S520 whether the chart is cached (i.e., stored locally on the client system) and, if so, the cached chart is rendered while contemporaneously fetching and rendering the corresponding active chart as described above. For example, the chart is deserialized at S525 (e.g., to Scalable Vector Graphics Document Object Model (SVG DOM)) and rendered at S530. The SVG ViewBox attribute may be used to support fluid resizing of the displayed cached visualization relative to the size of the container.

After rendering the chart, active data for the chart is fetched from the data store at S535. The data may be fetched by a worker thread at S535, while the cached chart is being rendered by a main thread at S530. Once the data is received, the current, or active, chart is rendered at S540 (e.g., by the main thread) and an indication (e.g., a "rendering complete" event) is provided at S545. The current chart is serialized at S550 and stored in the client persistence, for example by overwriting the prior cached version of the chart, if any.

Flow returns to S515 to determine whether all charts are loaded. If not, flow continues to S520 with respect to a next chart in the story and flow proceeds as described above. Accordingly, flow cycles between S515 through S545 as described above until each chart in the story is rendered with active data.

Once it is determined at S515 that all charts of the story have been loaded, an indication is provided at S555 that rendering of the page is complete. The indication may comprise firing of a "page complete" event according to some embodiments. Next, at S560, the cache is synchronized from the client persistence to the data store. Synchronization may comprise overwriting older serialized versions of one or more of the charts stored in the data store with current up-to-date serialized versions which were created during process 500 as described above. Accordingly, at a next initialization of the same or another client system, the newer versions will be synchronized to the corresponding client persistence at S505.

Figure 6:
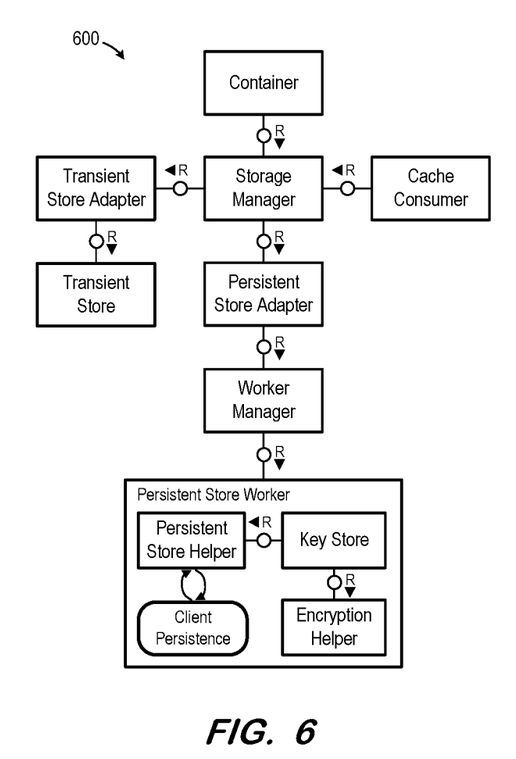
FIG. 6 is a block diagram of a system architecture according to some embodiments.

FIG. 6 is a functional block diagram of system 600 according to some embodiments. System 600 may comprise an implementation of client system 140 or client system 330 described above, but embodiments are not limited thereto. In some embodiments, the Container of system 600 is the aforementioned story, and the Cache Consumer is a functional module of a data visualization application. Individual components are described in further detail below.

For performance reasons, storage of cached data does not operate directly against the local Client Persistence in some embodiments. Instead, an intermediate in-memory (e.g., volatile memory) or Transient Store is used to capture data to be cached. Writing back to the Client Persistence occurs when there is minimal activity on the main thread, or when performance is less critical. Similarly, synchronization may be performed between the Client Persistence and the Transient Store soon after container load to minimize contention on the main thread. These activities are abstracted out to a Storage Manager. The design of the Storage Manager is intended to work against any arbitrary store types as long as the stores implement a pre-defined Application Programming Interface.

Operations against persistent stores are typically asynchronous, and many Create, Read, Update and Delete (CRUD) operations being performed on container load may lead to interleaving between other container load-related operations. Operations against the Client Persistence may therefore be delegated to web worker threads to alleviate contention on the main thread. A generic Worker Manager service is introduced to spawn workers to handle arbitrary pieces of work as well as automatically manage worker state. The Worker Manager service is intended as a centralized service for all worker thread activities and helps to control application impact on user device resources, remove maintenance of multiple worker manager implementations, and de-couple worker logic from worker management logic.

The stores described herein may implement a cache eviction strategy to evict stale or undesirable visualization entries. The cache eviction strategy may be evaluated in the following order: Max Age, Max entries, Max size. Max Age corresponds to the last modified time of the entry, and may be evaluated first to ensure all entries that are deemed too old are removed as a highest priority. The maximum number of entries ordered by last access time, or Max entries, is evaluated next as a low-cost mean way of eliminating excess entries. Ordering by last access time prioritizes entries the user has read from most recently, assuming the entry has not already expired, which should be handled by the preceeding Max age eviction. The Max size of all entries in aggregate, ordered by last access time, is then evaluated.

Cache loading or eviction may be performed during application load or upon completing a story rendering. For example, at application load, a key may be fetched from the persistent Key Store, and the entry will be pruned in-memory as it is read from the Client Persistence. During a synchronization from Client Persistence t to Transient Store, entries will be pruned in-memory as they are read from the Client Persistence. After receiving an indication that rendering of a story page is complete, all entries in the Transient Store will be persisted (regardless of whether they have expired between application load and the page render complete indication), the Client Persistence is pruned, and the Key Store is pruned.

To facilitate efficient retrieval and reading of data for cache eviction, the Client Persistence may be indexed by created/accessed/modified time and size. In order for the stores created in the Client Persistence to be granular per story (e.g., to prevent read/write of all cached data of the application when only the data for one story is needed), one store per story may be created. Metadata for each store may be tracked in a master/lookup store, which can then be used for store management, including metadata such as last accessed/modified/created time and size in bytes.

As part of persistent caching/storage, it may beneficial to ensure space usage from different caches does not become too large. The Transient Store size may be determined by settings, and the Client Persistence may track usage via a master lookup store.

Encryption/decryption may be performed when reading and writing to and from the Client Persistence (not to/from the Transient Store). Accordingly, encryption/decryption can also be pushed into the worker thread.

Keys may be stored client-side using an indexed database in a separate store from the cached data. This storage uses the ability of the client to keep keys 100% opaque and reduces complexity in the design (e.g., server-client key synchronization, etc.). Keys may expire after some small amount of time (e.g., a few days), and be rotated.

Figure 7:
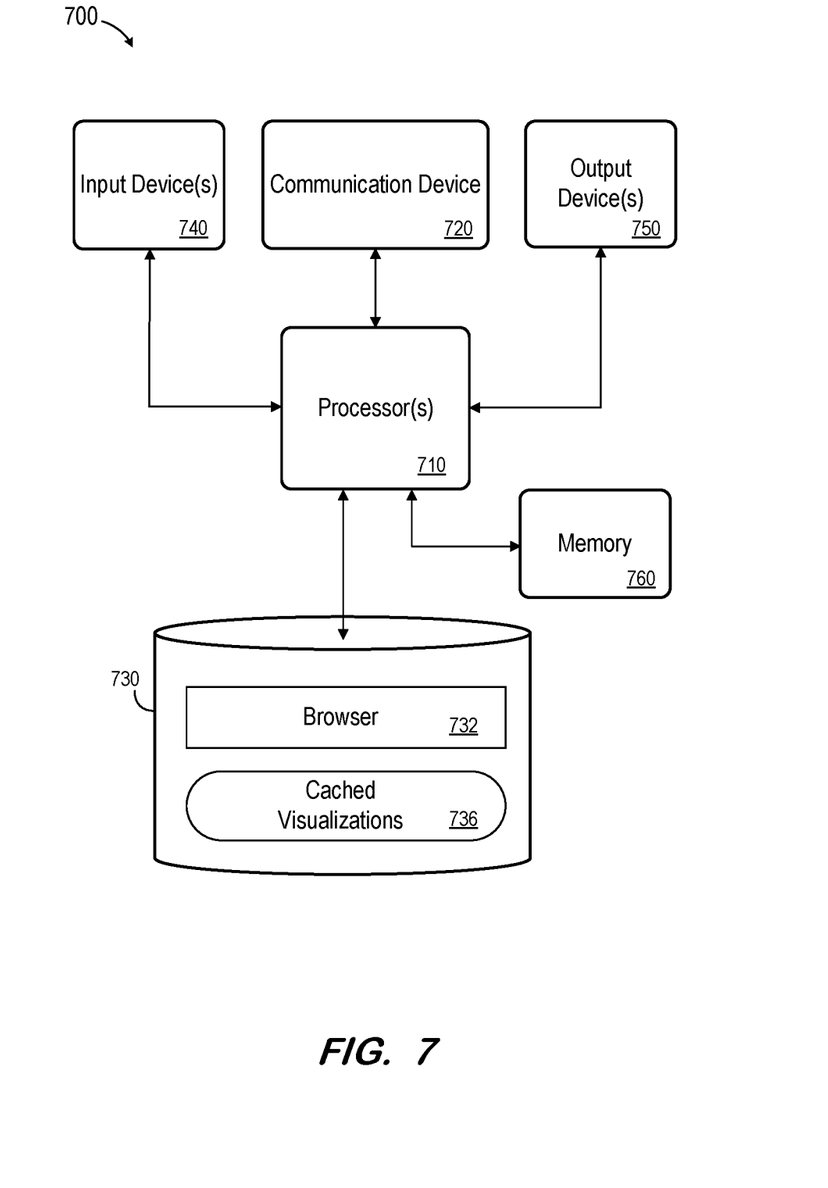
FIG. 7 is a block diagram of an apparatus according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of client 140 or client 330 as described above. Apparatus 700 may include other unshown elements according to some embodiments.

Apparatus 700 includes processor(s) 710 operatively coupled to communication device 720, data storage device 730, one or more input devices 740, one or more output devices 750 and memory 760. Communication device 720 may facilitate communication with external devices, such as a reporting client, or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM), Storage Class Memory (SCM) or any other fast-access memory.

Browser 732 may comprise program code executed by processor 710 to cause apparatus 700 to perform any one or more of the processes described herein. Embodiments are not limited to execution of these processes by a single apparatus.

Cached visualizations 734 may also be stored in volatile memory such as memory 760 during operation as described above. Data storage device 730 may also store data and other program code for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a display device;
   a memory system; and
   a processor to execute processor-executable process steps to:
   receive a first request to display a visualization; and
   in response to the first request:
   determine that a cached version of the visualization is stored in the memory system;
   render the cached version of the visualization;
   display the rendered cached version on the display device;
   request active data associated with the visualization from a remote data source;
   receive the active data associated with the visualization;
   render an active version of the visualization based on the active data; and
   display the rendered active version in place of the displayed rendered cached version;
   serialize the rendered active version;
   store the serialized version in the memory system;
   receive a second request to display the visualization; and
   in response to the second request:
   determine that the serialized version is stored in the memory system;
   de-serialize the serialized version and render the de-serialized version;
   display the rendered de-serialized version on the display;
   request second active data associated with the visualization from the remote data source;
   receive the second active data associated with the visualization;
   render a second active version of the visualization based on the second active data; and
   display the rendered second active version of the visualization in place of the displayed rendered de-serialized version.

2. The system according to claim 1, wherein the rendering of the cached version of the visualization comprises:
   rendering of the cached version in a first div associated with a first display location,
   wherein the rendering of the active version of the visualization comprises rendering of the active version in a hidden second div associated with the first display location and in a hidden mode, and
   wherein the display of the rendered active version in place of the displayed rendered cached version comprises unhiding the second div.

3. The system according to claim 2, wherein a main processing thread of the processor is executed to:
   render the cached version of the visualization, and
   wherein a worker processing thread of the processor is executed to request the active data associated with the visualization from the remote data source while the main thread renders the cached version of the visualization.

4. The system according to claim 1, wherein a main processing thread of the processor is executed to:
   render the cached version of the visualization, and
   wherein a worker processing thread executes to request the active data associated with the visualization from the remote data source while the main thread renders the cached version of the visualization.

5. The system according to claim 1, wherein the processor to execute processor-executable process steps to:
   receive a third request to display a second visualization; and
   in response to the third request:
   determine that a cached version of the second visualization is not stored in the memory system;
   request active data associated with the second visualization from the remote data source;
   receive the active data associated with the second visualization;
   render an active version of the second visualization based on the active data associated with the second visualization; and
   display the rendered active version of the second visualization.

6. The system according to claim 5, wherein the rendering of the cached version of the visualization comprises:
   rendering of the cached version in a first div associated with a first display location,
   wherein the rendering of the active version of the visualization comprises rendering of the active version in a hidden second div associated with the first display location and in a hidden mode, and
   wherein the display of the rendered active version in place of the displayed rendered cached version comprises unhiding the second div.

7. A method, executed by a processor, comprising:
   receiving a first request to display a visualization; and
   in response to the first request:
   determining that a cached version of the visualization is stored in a local memory system;
   rendering the cached version of the visualization;
   displaying the rendered cached version on a display device;
   requesting active data associated with the visualization from a remote data source;
   receiving the active data associated with the visualization while the rendered cached version is displayed;
   rendering an active version of the visualization based on the active data; and
   replacing the displayed rendered cached version with the rendered active version;
   serializing the rendered active version;
   storing the serialized version in the memory system;
   receiving a second request to display the visualization; and
   in response to the second request:
   determining that the serialized version is stored in the memory system;
   de-serializing the serialized version and rendering the de-serialized version;

displaying the rendered de-serialized version on the display device;
requesting second active data associated with the visualization from the remote data source;
receiving the second active data associated with the visualization while the rendered de-serialized version is displayed;
rendering a second active version of the visualization based on the second active data; and
replacing the displayed rendered de-serialized version with the rendered second active version.

8. The method according to claim 7, wherein the rendering the cached version of the visualization comprises:
rendering the cached version in a first div associated with a first display location,
wherein the rendering the active version of the visualization comprises rendering the active version in a hidden second div associated with the first display location and in a hidden mode, and
wherein the replacing the displayed rendered cached version with the rendered active version comprises unhiding the second div.

9. The method according to claim 8, wherein a main processing thread of the processor renders the cached version of the visualization, and
wherein a worker processing thread of the processor requests the active data associated with the visualization from the remote data source while the main thread renders the cached version of the visualization.

10. The method according to claim 7, wherein a main processing thread of the processor renders the cached version of the visualization, and
wherein a worker processing thread of the processor requests the active data associated with the visualization from the remote data source while the main thread renders the cached version of the visualization.

11. The method according to claim 7, further comprising:
receiving a third request to display a second visualization; and
in response to the third request:
determining that a cached version of the second visualization is not stored in the memory system;
requesting active data associated with the second visualization from a remote data source;
receiving the active data associated with the second visualization;
rendering an active version of the second visualization based on the active data associated with the second visualization; and
displaying the rendered active version of the second visualization.

12. The method according to claim 11, wherein the rendering the cached version of the visualization comprises:
rendering the cached version in a first div associated with a first display location,
wherein the rendering the active version of the visualization comprises rendering the active version in a hidden second div associated with the first display location, and
wherein the replacing the displayed rendered version with a display of the rendered active version comprises unhiding the second div.

13. A device comprising:
a memory;
a processor; and
a display, wherein the device is configured by the processor to:

receive a request to display a data chart; and
in response to the request:
retrieve a cached version of the data chart from the memory;
display the cached version of the data chart on the display;
while the cached version of the data chart is displayed, request current data of the data chart from a remote data source;
while the cached version of the data chart is displayed, render an active version of the data chart based on the current data; and
replace the displayed cached version with the rendered active version;
serialize the rendered active version;
store the serialized version in the memory;
receive a second request to display the data chart; and
in response to the second request:
determine that the serialized version is stored in the memory;
de-serialize the serialized version and render the de-serialized version;
display the rendered de-serialized version on the display;
while the rendered de-serialized version of the data chart is displayed, request second current data of the data chart from the remote data source;
while the rendered de-serialized version of the data chart is displayed, render a second active version of the data chart based on the second current data; and
replace the displayed rendered de-serialized version with the rendered second active version.

14. The device according to claim 13, wherein the display of the cached version comprises:
rendering of the cached version in a first div associated with a first display location,
wherein the display of the active version comprises rendering the active version in a hidden second div associated with the first display location and in a hidden mode, and
wherein the replacing the displayed rendered cached version with the rendered active version comprises unhiding the second div.

15. The device according to claim 14, wherein a main processing thread of the processor displays the cached version, and wherein a worker processing thread of the processor requests the current data of the data chart from the remote data source while the main thread displays the cached version.

16. The device according to claim 13, the device is further configured to:
receive a third request to display a second data chart; and
in response to the third request:
determine that a cached version of the second data chart is not stored in the memory;
request current data of the second data chart from the remote data source;
render an active version of the second data chart based on the current data of the second data chart; and
display the rendered active version of the second chart.

17. The method according to claim 16, wherein the rendering of the cached version comprises:
rendering the cached version in a first div associated with a first display location, wherein the rendering of the active version comprises rendering the active version in a hidden second div associated with the first display location, and
wherein the replacing the displayed rendered version with the rendered active version comprises unhiding the second div.

\* \* \* \* \*